United States Patent
Zhang et al.

(10) Patent No.: US 8,344,709 B2
(45) Date of Patent: Jan. 1, 2013

(54) INTELLIGENT SWITCHING CONTROLLER AND POWER CONVERSION CIRCUITS AND METHODS

(75) Inventors: Wanfeng Zhang, Palo Alto, CA (US); Jianqing Lin, Pleasanton, CA (US); Shaoan Dai, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 748 days.

(21) Appl. No.: 12/556,859

(22) Filed: Sep. 10, 2009

(65) Prior Publication Data

US 2010/0090671 A1    Apr. 15, 2010

Related U.S. Application Data

(60) Provisional application No. 61/096,159, filed on Sep. 11, 2008.

(51) Int. Cl.
*G05F 1/10* (2006.01)
*G05F 1/40* (2006.01)
*G05F 5/00* (2006.01)

(52) U.S. Cl. .................. 323/222; 323/285; 323/299

(58) Field of Classification Search .............. 323/222, 323/225, 282–285, 299, 301, 351
See application file for complete search history.

(56) References Cited

U.S. PATENT DOCUMENTS

| | | | | |
|---|---|---|---|---|
| 4,315,316 | A * | 2/1982 | Boros et al. ................... | 702/64 |
| 6,225,795 | B1 * | 5/2001 | Stratakos et al. ............. | 323/283 |
| 6,987,380 | B1 * | 1/2006 | Lee ............................... | 323/285 |
| 7,075,278 | B2 * | 7/2006 | Uematsu et al. .............. | 323/282 |
| 8,008,902 | B2 * | 8/2011 | Melanson et al. ............ | 323/285 |
| 8,054,058 | B2 * | 11/2011 | Liu et al. ....................... | 323/284 |
| 8,085,024 | B2 * | 12/2011 | Prodic et al. .................. | 323/283 |
| 2004/0008016 | A1 | 1/2004 | Sutardja et al. | |
| 2007/0159154 | A1 | 7/2007 | Boomkamp et al. | |
| 2008/0205103 | A1 | 8/2008 | Sutardja et al. | |

* cited by examiner

*Primary Examiner* — Jessica Han

(57) ABSTRACT

In one embodiment, the present invention includes a circuit having a voltage estimation circuit to receive a first voltage and generate an estimation of an output voltage of a power conversion circuit based on the first voltage. The first voltage is from a circuit node between a first terminal of a switch and a first terminal of an inductor. The circuit further comprises a current estimation circuit to receive a first current and generate an estimation of an output current of the power conversion circuit based on the first current. The first current is a current through the switch. The circuit further includes a pulse width modulation circuit to produce a pulse width modulated signal based on the estimation of an output voltage and the estimation of an output current.

22 Claims, 6 Drawing Sheets

INTELLIGENT SWITCHING CONTROLLER AND POWER CONVERSION CIRCUITS AND METHODS

CROSS REFERENCE TO RELATED APPLICATIONS

This application claims the benefit of priority from U.S. Provisional Application No. 61/096,159, filed Sep. 11, 2008, the disclosure of which is incorporated herein by reference in its entirety.

BACKGROUND

The present invention relates to switching power conversion circuits.

Electronic devices require voltage and current to operate. Generally, different electronic devices and systems have different voltage and current operating requirements. For example, some devices require a 3.3 volt supply voltage that is capable of providing up to 100 mA, and other devices require a 5 volt supply voltage that is capable of providing 1 A of current or more. Power is often provided from wall sockets or batteries that supply standard voltages and currents. Wall sockets typically provide 110 volts of AC power, and batteries provide a wide range of voltages as DC power. Accordingly, to bridge the gap between voltages and currents provided by power sources, such as wall sockets or batteries, and the voltages and currents required by different electronic devices, such as cell phones or computers, power conversion circuits are desirable.

One class of power conversion circuits includes switching power conversion circuits. Within this category there are two different types of configurations (or modes) for power conversion circuits—boost mode and buck mode. In boost mode, the output voltage is greater than the input voltage. Conversely, in buck mode, the input voltage is greater than the output voltage.

Switching power conversion circuits typically include at least one inductor for storing energy, a switch for periodically recharging the inductor, and a filter (typically a capacitor) to filter out noise from the switch. A typical switching power conversion circuit monitors output voltage and/or current levels, and generates a feedback signal. The feedback signal, in turn, is used to generate a pulse width modulated (PWM) signal for turning the switch on and off. Many power conversion circuits are configured to maintain the output voltage at a constant level across a range of output currents.

Switching power conversion circuits typically operate using feedback signals to monitor the output. Because existing techniques require monitoring of the output, extra dedicated pins on an integrated circuit are typically required to receive the feedback inputs.

Switching power conversion circuits are typically implemented using analog circuits. Analog circuits typically occupy larger areas of silicon, which increases costs. Additionally, external switches occupy external space and adds cost on the system.

SUMMARY

Embodiments of the present invention improve power conversion circuits and methods. In one embodiment, the present invention includes a circuit comprising a voltage estimation circuit configured to receive a voltage. The voltage is from a circuit node between a terminal of a switch and a terminal of an inductor, and the voltage estimation circuit generates an estimation of an output voltage of a power conversion circuit based on the voltage. The circuit further includes a current estimation circuit configured to receive a current. The current is related to a current through the switch, and the current estimation circuit generates an estimation of an output current of the power conversion circuit based on the current. The circuit further includes a pulse width modulation circuit configured to produce a pulse width modulated signal based on the estimation of an output voltage and the estimation of an output current.

In one embodiment, the voltage estimation circuit averages the voltage over a time period in a switching cycle to generate the estimation of the output voltage.

In one embodiment, the current is a first current and wherein the voltage estimation circuit generates the estimate of the output voltage based on the voltage during a time period when the switch is off and when the inductor is conducting a second current.

In one embodiment, the current is a first current and wherein the voltage estimation circuit generates the estimate of the output voltage based on the first voltage during a time period when the switch is off and when the inductor is not conducting a second current.

In one embodiment, the current estimation circuit generates the estimation of the output current based on an average current through a component over a full switching cycle.

In one embodiment, the component is a diode. In one embodiment, the component is the inductor.

In one embodiment, the voltage is sampled and wherein the voltage estimation circuit generates the estimation of the output voltage digitally. In another embodiment, voltage estimation circuit is an analog circuit.

In one embodiment, the current is sampled and wherein the current estimation circuit generates the estimation of the output current digitally. In another embodiment, current estimation circuit is an analog circuit.

In one embodiment, the circuit is integrated on a silicon chip.

In one embodiment, the switch is a MOS device and wherein the silicon chip comprises the MOS device.

In one embodiment, the silicon chip consists of three pads, including a first pad to receive an input voltage, a second pad to receive the voltage, and a third pad to receive a reference voltage.

In one embodiment, the power conversion circuit is configured as a boost mode converter.

In one embodiment, the power conversion circuit is configured as a buck mode converter.

In one embodiment, the power conversion circuit is configured as a buck-boost mode converter.

In one embodiment, the present invention includes a method comprising estimating an output voltage of a power conversion circuit based on a voltage, wherein the voltage is from a circuit node between a terminal of a switch and a terminal of an inductor, estimating an output current of a power conversion circuit based on a current, wherein the current is through the switch, and generating a pulse width modulated signal based on the estimation of an output voltage and the estimation of an output current.

In one embodiment, the current is a first current and wherein estimating the output voltage is based on the voltage during a time period of a switching cycle after the switch is off and when the inductor is conducting a second current.

In one embodiment, the current is a first current and wherein estimating the output voltage is based on the voltage during a time period of a switching cycle after the switch is off and when the inductor is not conducting a second current.

In one embodiment, estimating the output current is based on an average current through the inductor over a full switching cycle.

In one embodiment, estimating the output current is based on an average current through a diode over a full switching cycle.

The following detailed description and accompanying drawings provide a better understanding of the nature and advantages of the present invention.

DETAILED DESCRIPTION

Described herein are techniques for power conversion. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
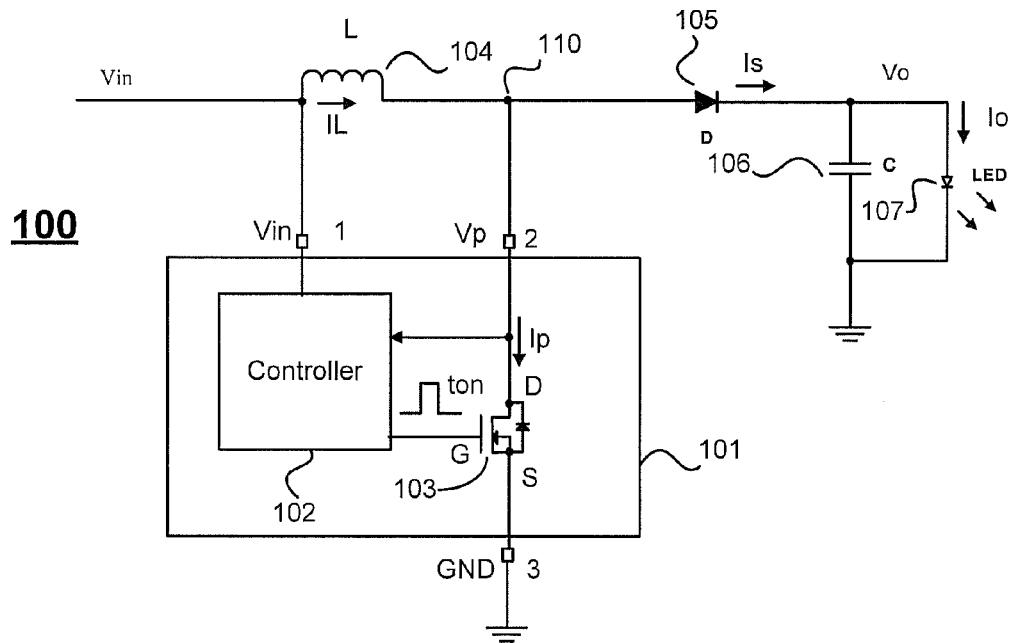
FIG. 1 illustrates a power conversion circuit according to one embodiment of the present invention.

FIG. 1 illustrates a power conversion circuit 100 according to one embodiment of the present invention. Power conversion circuit 100 includes an integrated circuit (IC) 101 including a controller 102 and MOS switch 103. IC 101 is a three pad IC and may be in a 3 pin package, for example. MOS switch 103 may be external or integrated with controller 102 on the same piece of silicon. Circuit 100 further includes an inductor 104, a diode 105, a capacitor 106, and a load 107. In this example the load 107 is one or more light emitting diodes (LEDs), for example. Circuit 100 converts an input voltage Vin and an input current into an output voltage Vo and an output current Io at the load 107. Circuit 100 is configured in a boost mode configuration, where the output voltage Vo is greater than the input voltage Vin. The input voltage Vin is coupled to an input of controller 102. Switch 103 includes a gate terminal G coupled to a gate drive output terminal of controller 102, a source terminal S coupled to a reference voltage (ground or GND), and a drain terminal D coupled to a node 110 between inductor 104 and an anode of diode 105 having a voltage Vp. Switch 103 receives a gate drive signal ton from controller 102, which may be a pulse width modulated (PWM) signal. Gate drive signal ton turns switch 103 on and off. The voltage Vp at node 110 and the current Ip through switch 103 are detected by controller 102 and used to generate estimates of the output voltage Vo and output current Io as described below. A cathode of diode 105 is coupled to the load 107 and to one terminal of capacitor 106. The capacitor 106 and load are coupled in parallel to ground.

Figure 2:
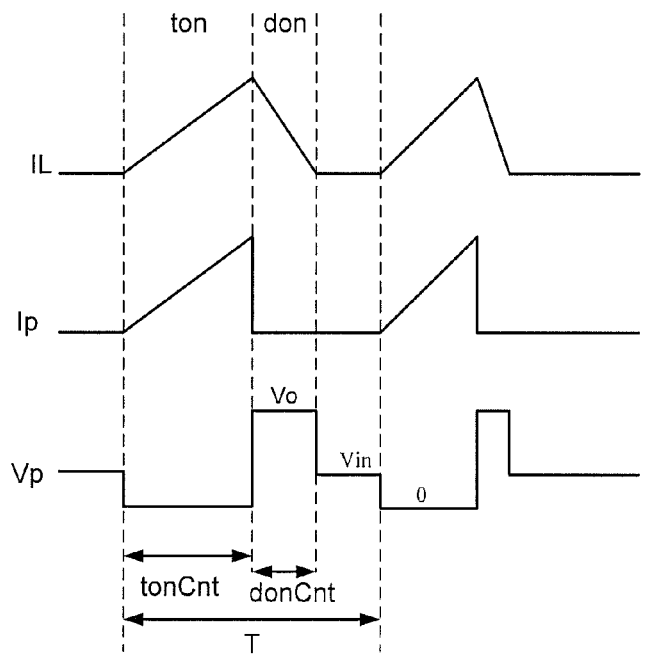
FIG. 2 illustrates a timing diagram of the power conversion circuit of FIG. 1.

FIG. 2 illustrates a timing diagram of the power conversion circuit of FIG. 1. A complete switching cycle is denoted by a time T. Initially, the gate drive signal turns on switch 103. During this time period of the switching cycle, node 110 between inductor 104 and diode 105 is grounded (Vp=0), and a current IL through inductor 104 is equal to a current Ip through the switch 103. The current IL and current Ip both increase linearly while the switch is on. When the gate drive signal turns off switch 103, node 110 between inductor 104 and diode 105 is disconnected from ground and is approximately equal to the output voltage Vo because current IL continues to flow through diode 105 to the load. Accordingly, the voltage Vp during the time period denoted don, after switch 103 turns off, may be used as an estimate of the output voltage Vo. Vp is equal to Vo plus the turn on voltage of diode 105. The turn on voltage of the diode 105 may be compensated for to obtain an accurate estimate of the output voltage. In this example, the current IL discharges down to zero, at which point Vp is equal to Vin, and a new switching cycle begins. In this example, the total current delivered to the load during the switching cycle is equal to the average current through diode 105 over a full switching cycle. Accordingly, the output current may be estimated as an average of such current. This example is referred to as discontinuous charge mode (DCM) because the charge in inductor 104 reduces to zero current.

Figure 3:
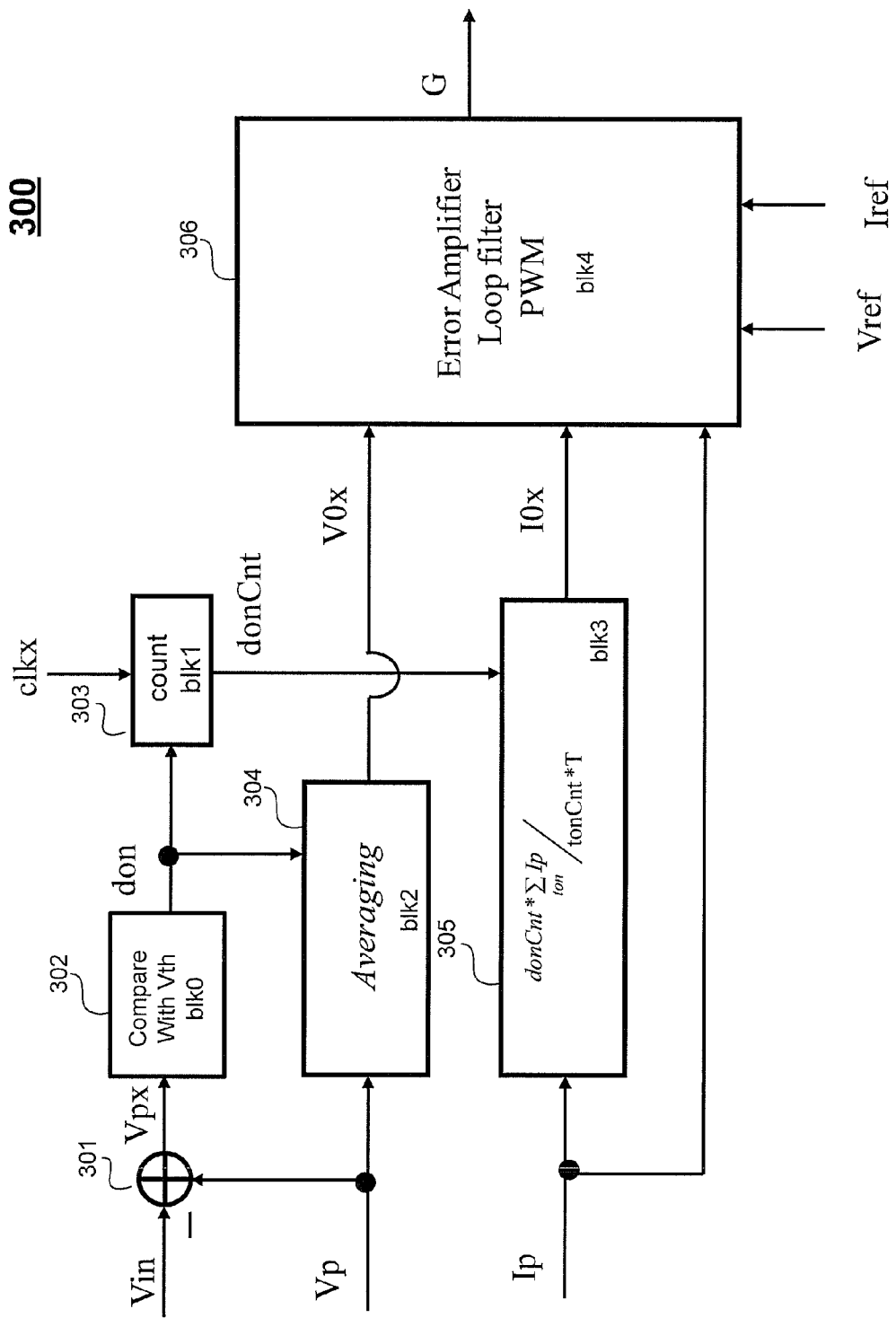
FIG. 3 illustrates a controller according to one embodiment of the present invention.

FIG. 3 illustrates a controller according to one embodiment of the present invention. Controller 300 receives input voltage Vin, voltage Vp, current Ip, and a clock signal clkx to generate estimates of the output voltage Vo and output current Io of a power conversion circuit (e.g., circuit 100 of FIG. 1). In this example, Vin is subtracted at 301 from Vp to generate a signal Vpx. Vpx is compared to a threshold voltage Vth using block "blk0" 302, which may be implemented using a comparator, for example. The comparison of Vpx and Vth allows the circuit to detect when Vp rises from 0 volts to Vo, and then from Vo to Vin, during a switching cycle. The output of blk0 302 is a signal don (e.g., diode on). Vth is set so that don is active during the time period where Vp is equal to Vo when the switch 103 is turned off and the current IL is falling. The signal don is inactive after switch 103 is turned off when the current IL drops to zero (when Vp switches from Vo to Vin in FIG. 2). Accordingly, blk0 302 may be used to detect the time period when Vp is equal to Vo. In this example, signal don is used to activate a voltage estimation circuit "blk2" 304, which in this example performs averaging. Voltage estimation circuit 304 may average the value of Vp during the time period that Vp=Vo, and generate an estimate of the output voltage V0x.

In this implementation, controller 300 further includes a timing block "blk1" 303. In this example, the blk1 303 is a counter that receives clkx and signal don. Blk1 303 measures the time after switch 103 is off and diode 105 is conducting current to the load by generating a count donCnt. Ip and donCnt may be used to generate an estimate of the output current in current estimation circuit "blk3" 305 according to the following equation:

$$IOX = \frac{\left(donCnt * \sum_{ton} Ip\right)}{tonCnt * T}$$

Where tonCnt is the time ton is active. In the estimation of the output current Io, Ip is measured over the time period tonCnt, to produce an average current through switch 103. Since the average current through the switch 103 is equal to the average current through diode 105 after switch 103 is turned off (because inductor current IL falls to zero), the average current Ip may be used to determine the estimated output current I0$x$.

The estimated output voltage V0$x$, estimated output current I0$x$, and Ip (e.g., for current control) may be provided as inputs to a processing block "blk4" 306, which may include an error amplifier, loop filter, and pulse width modulator (PWM) to generate a gate drive signal G for turning switch 103 on and off. Blk4 306 further receives a desired output voltage Vref and a desired output current Iref, which are used to control the desired levels of the output voltage and output current at the load. These values may be programmed using analog or digital values to set the output voltage and current into the load. The above blocks and processes may be implemented using analog circuits, or by sampling Vin, Vp, and Ip, for example, and processing the signals digitally (e.g., using a digital signal processor).

Figure 4:
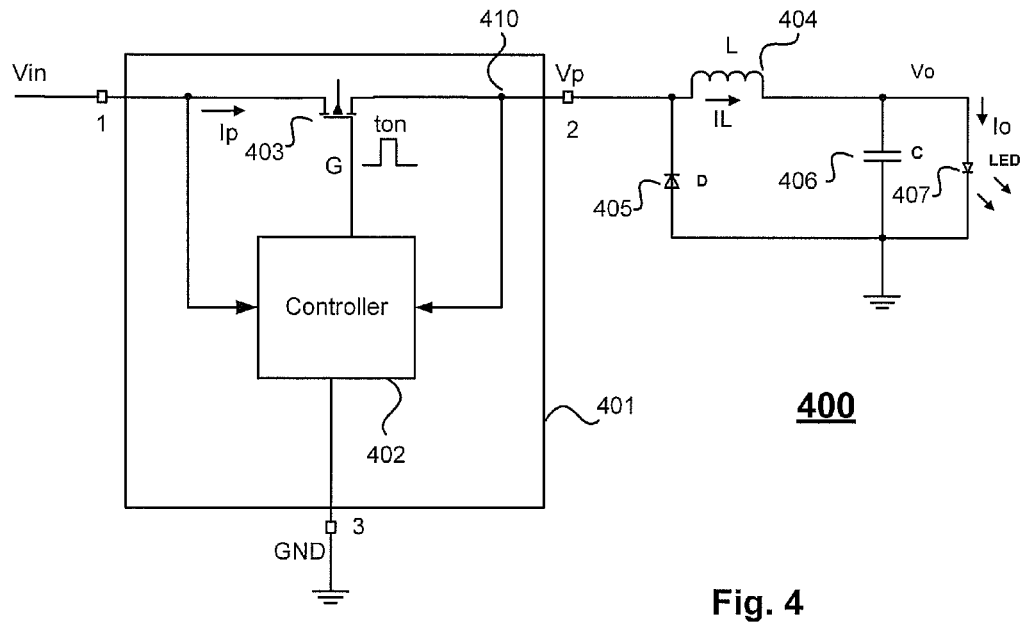
FIG. 4 illustrates another power conversion circuit according to one embodiment of the present invention.

FIG. 4 illustrates a power conversion circuit 400 according to one embodiment of the present invention. Power conversion circuit 400 includes an integrated circuit (IC) 401 including a controller 402 and MOS switch 403. IC 401 is a three pad IC and may be in a 3 pin package, for example. Circuit 400 further includes an inductor 404, a diode 405, a capacitor 406, and a load 407. In this example the load 407 is one or more light emitting diodes (LEDs). Circuit 400 converts an input voltage Vin and an input current into an output voltage Vo and an output current Io at the load 407. Circuit 400 is configured in a buck mode configuration, where the input voltage Vin is greater than the output voltage Vo. The input voltage Vin is coupled to an input of controller 402. Switch 403 includes a gate terminal G coupled to a gate drive output terminal of controller 402, an input terminal coupled to Vin, and an output terminal coupled to a node 410 between switch 403 and inductor 404 having a voltage Vp. Switch 403 receives a gate drive signal ton from controller 402, which may be a pulse width modulated (PWM) signal. Gate drive signal ton turns switch 403 on and off. The voltage Vp at node 410 and the current Ip through switch 403 are detected by controller 402 and used to generate estimates of the output voltage Vo and output current Io as described below. A cathode of diode 405 is coupled node 410. A second terminal of inductor 404 is coupled to a terminal of capacitor 406 and a terminal of load 407. The anode of diode 405, a second terminal of capacitor 406, and a second terminal of load 407 are coupled to ground.

Figure 5:
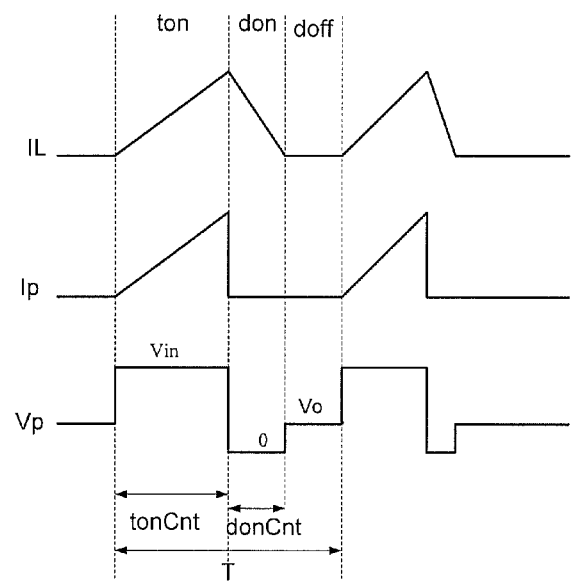
FIG. 5 illustrates a timing diagram of the power conversion circuit of FIG. 4.

FIG. 5 illustrates a timing diagram of the power conversion circuit of FIG. 4. A complete switching cycle is denoted by a time T. Initially, the gate drive signal turns on switch 403. During this time period of the switching cycle, node 410 is coupled to Vin (Vp=Vin), and a current IL through inductor 404 is equal to a current Ip through the switch 403. The current IL and current Ip both increase linearly while the switch is on. When the gate drive signal turns off switch 403, node 410 is disconnected from the input and is approximately equal to ground because current IL continues to flow from ground through diode 405. In this example, the current IL discharges down to zero. During a time period when switch 403 is off and when inductor 404 is not conducting current, Vp is equal to Vo. Since current IL is not flowing, the current in diode 405 is off and this time period is denoted doff in FIG. 5. Accordingly, the voltage Vp during the time period denoted doff, after switch 403 turns off and the current IL is zero, may be used as an estimate of the output voltage Vo. In this example, the total current delivered to the load during the switching cycle is equal to the average current through inductor 404 over a full switching cycle. Accordingly, the output current may be estimated as an average of such current.

Figure 6:
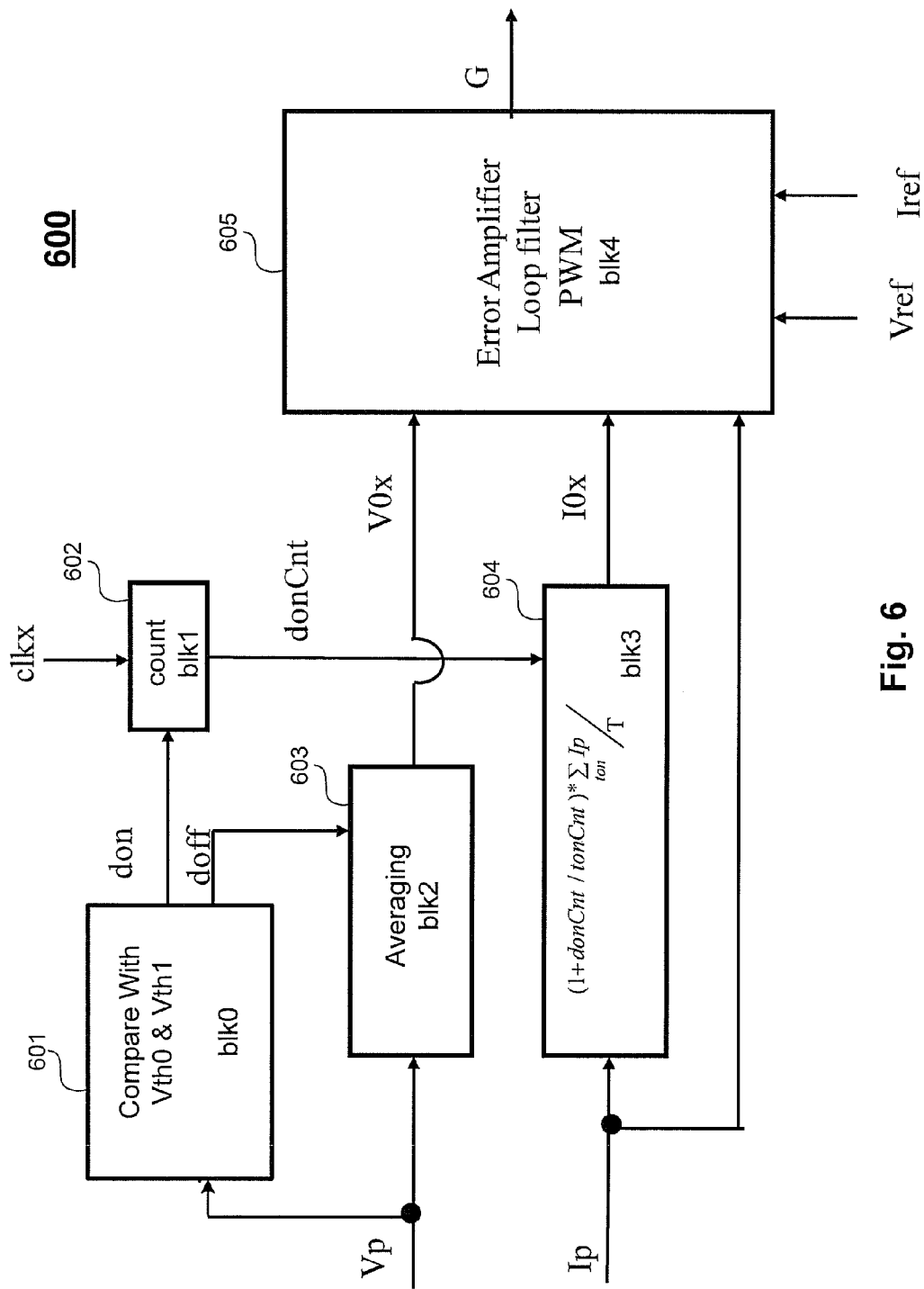
FIG. 6 illustrates another controller according to one embodiment of the present invention.

FIG. 6 illustrates a controller according to one embodiment of the present invention. Controller 600 receives voltage Vp, current Ip, and a clock signal clkx to generate estimates of the output voltage Vo and output current Io of a power conversion circuit (e.g., circuit 400 of FIG. 4). In this example, Vp is compared to two threshold voltages Vth0 and Vth1 using block "blk0" 601, which may be implemented using one or more comparators, for example. The comparison of Vp and Vth0 allows the circuit to detect when Vp rises from 0 volts to Vo volts after current in the current IL drops to zero. In this example, a second threshold Vth1 is used to detect when Vp rises again from Vo to Vin at the beginning of the next switching cycle. The output of blk0 is a signal don (e.g., diode on) and another signal doff (e.g., diode off). Vth0 is set so that don is active during the time period where Vp is equal to 0 volts when switch 403 is turned off and the current IL is falling. Vth1 is set so that doff is active during the time period where Vp is equal to Vo when the switch 403 is turned off and the current IL is zero. Accordingly, comparator block 601 may be used to detect the time period when Vp is equal to Vo. In this example, signal doff is used to activate a voltage estimation circuit "blk2" 603, which in this example performs averaging. Voltage estimation circuit 603 may average the value of Vp during the time period that Vp=Vo, and generate an estimate of the output voltage V0$x$.

In this implementation, controller 600 further includes a timing block "blk1" 602. In this example, the Blk1 602 is a counter that receives clkx and signal don. Blk1 602 measures the time after switch 403 is off and after inductor 404 stops conducting current to load 407 by generating a count donCnt. Ip and donCnt may be used to generate an estimate of the output current in current estimation circuit "blk3" 604 according to the following equation:

$$IOX = \frac{\left((1 + donCnt/tonCnt) * \sum_{ton} Ip\right)}{T}$$

In the estimation of the output current Io, Ip is measured over the time period tonCnt, to produce an average current through switch 403. The average current through switch 403 is equal to the average current through inductor 404 from a time after switch 403 is turned off to the time the inductor current IL reduces to zero over a time period donCnt. This is because inductor current IL increases from zero while switch 403 is on and decreases back to zero after switch 403 is off. The average current through inductor 404 may, therefore, be calculated from Ip. The above equation is the total average current delivered by inductor 404 to load 407 during a switching cycle having a period T. Accordingly, the average current Ip may be used to determine the estimated output current I0$x$.

The estimated output voltage V0x, estimated output current I0x, switch current Ip, Vref, and Iref may be provided as inputs to a processing block "blk4" 605, which may include an error amplifier, loop filter, and pulse width modulator (PWM) to generate a gate drive signal G for turning switch 403 on and off and setting the output voltage and output current as described above in FIG. 3.

Figure 7:
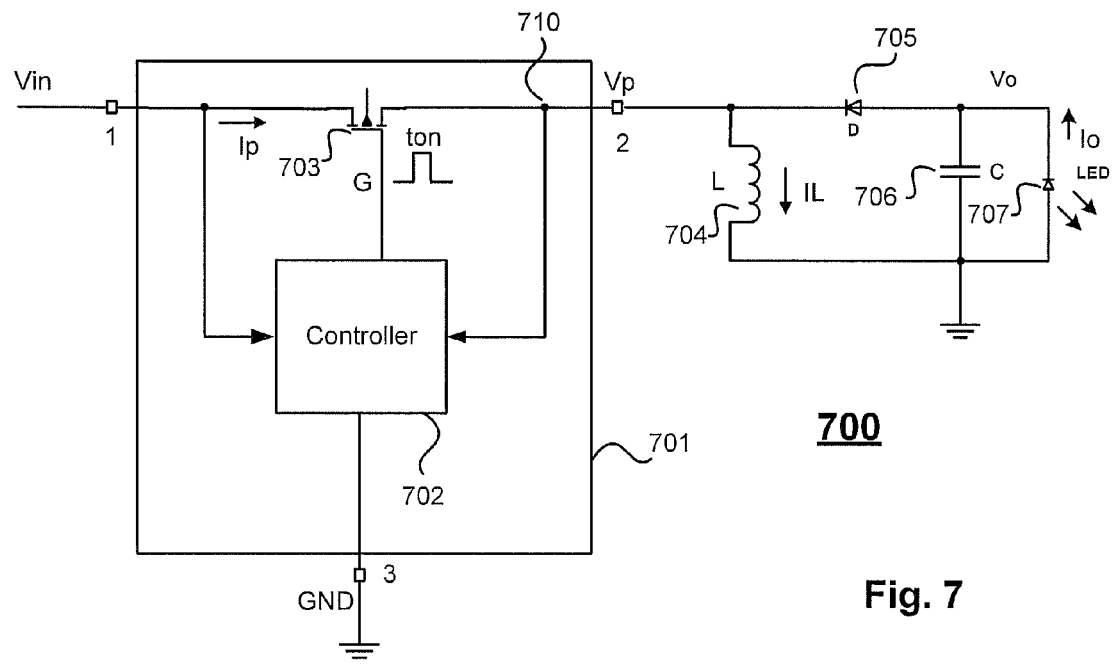
FIG. 7 illustrates yet another power conversion circuit according to one embodiment of the present invention.

FIG. 7 illustrates a power conversion circuit 700 according to one embodiment of the present invention. Power conversion circuit 700 includes an integrated circuit (IC) 701 including a controller 702 and MOS switch 703. As in the prior examples, IC 701 is a three pad IC and may be in a 3 pin package, for example. However, IC 701 could have additional pads and/or pins. Circuit 700 further includes an inductor 704, a diode 705, a capacitor 706, and a load 707. As above, in this example, the load 707 is one or more light emitting diodes (LEDs). However, other loads may be connected to the output. Circuit 700 converts an input voltage Vin and an input current into an output voltage Vo and an output current Io at the load 707. Circuit 700 is configured in a buck-boost mode configuration, where the input voltage Vin is greater/lower than the output voltage Vo and Vo is negative. The input voltage Vin is coupled to an input of controller 702. Switch 703 includes a gate terminal G coupled to a gate drive output terminal of controller 702, an input terminal coupled to Vin, and an output terminal coupled to a node 710 between switch 703 and inductor 704 having a voltage Vp. Switch 703 receives a gate drive signal ton from controller 702, which may be a pulse width modulated (PWM) signal. Gate drive signal ton turns switch 703 on and off. The voltage Vp at node 710 and the current Ip through switch 703 are detected by controller 702 and used to generate estimates of the output voltage Vo and output current Io as described below. A cathode of diode 705 is coupled node 710. An anode of diode 705 is coupled to a terminal of capacitor 706 and a terminal of load 707. A second terminal of inductor 704, a second terminal of capacitor 706, and a second terminal of load 707 are coupled to ground.

Figure 8:
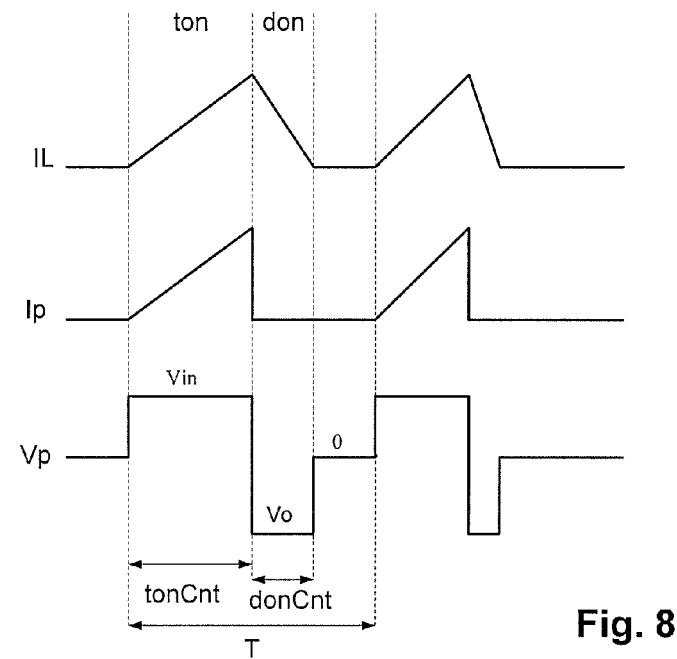
FIG. 8 illustrates a timing diagram of the power conversion circuit of FIG. 7.

FIG. 8 illustrates a timing diagram of the power conversion circuit of FIG. 7. A complete switching cycle is denoted by a time T. Initially, the gate drive signal turns on switch 703. During this time period of the switching cycle, node 710 is coupled to Vin (Vp=Vin), and a current IL through inductor 704 is equal to a current Ip through the switch 703. The current IL and current Ip both increase linearly while the switch is on. When the gate drive signal turns off switch 703, node 710 is disconnected from the input and drops below ground to Vo because current IL continues to flow to ground, which turns on diode 705. Accordingly, the voltage Vp during the time period denoted don, after switch 703 turns off, may be used as an estimate of the output voltage Vo. Vp is equal to Vo minus the turn on voltage of diode 705. The turn on voltage of the diode 705 may be compensated for to obtain an accurate estimate of the output voltage. In this example, the current IL discharges down to zero, at which point Vp is equal to ground, and a new switching cycle begins. In this example, the total current delivered to the load during the switching cycle is equal to the average current through diode 705 over a full switching cycle. Accordingly, the output current may be estimated as an average of such current.

Figure 9:
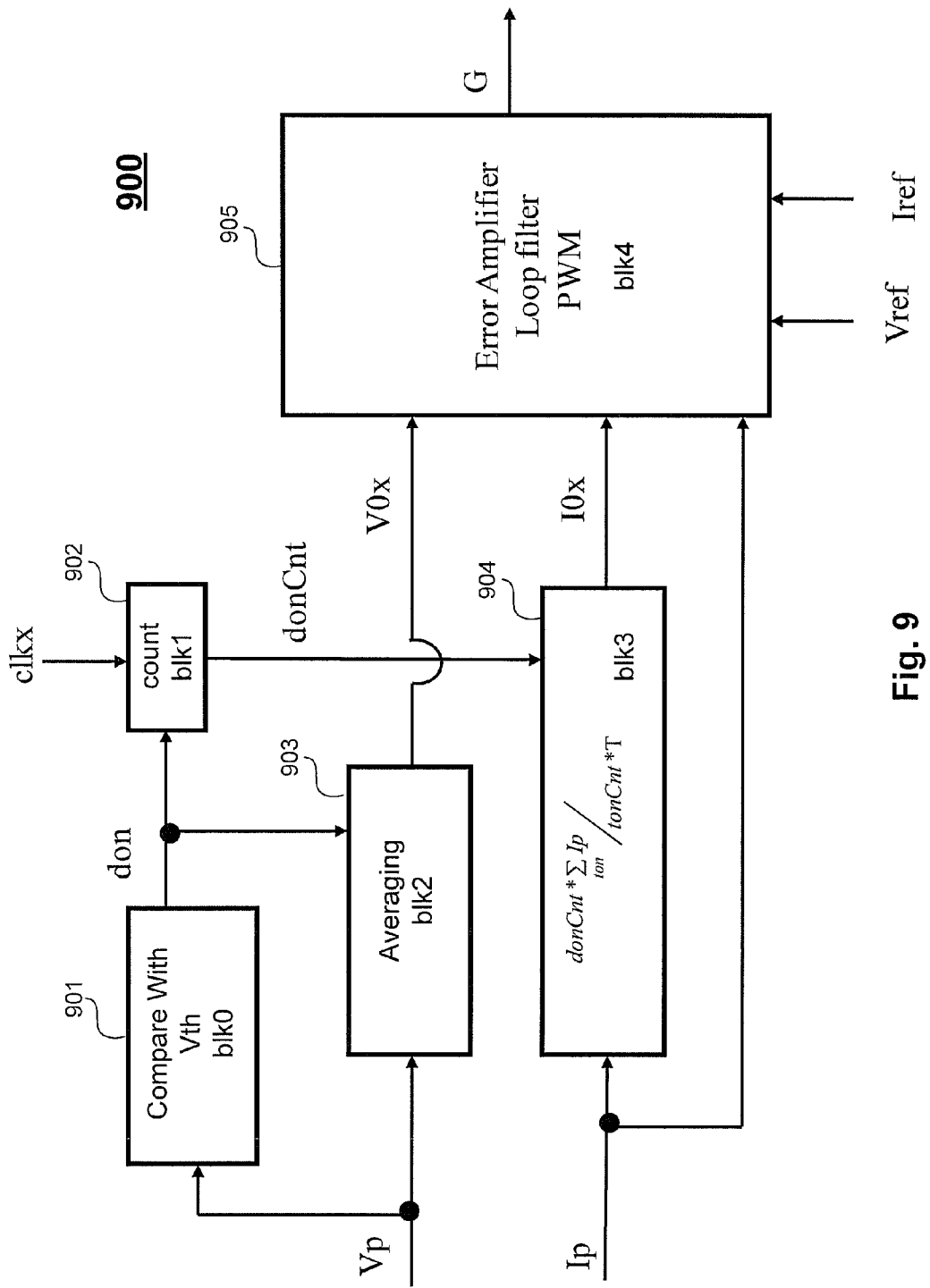
FIG. 9 illustrates yet another controller according to one embodiment of the present invention.

FIG. 9 illustrates a controller according to one embodiment of the present invention. Controller 900 receives voltage Vp, current Ip, and a clock signal clkx to generate estimates of the output voltage Vo and output current Io of a power conversion circuit (e.g., circuit 900 of FIG. 9). In this example, Vp is compared to a threshold voltage Vth using block "blk0" 901, which may be implemented using a comparator, for example.

The comparison of Vp and Vth allows the circuit to detect when Vp falls from Vin to Vo after switch 703 turns off and further detects when Vp rises again from Vo to 0 volts when the current IL drops to zero. The output of blk0 is a signal don (e.g., diode on). Vth is set so that don is active during the time period where Vp is equal to Vo when switch 703 is turned off and the current IL is falling. Accordingly, "blk0" 901 may be used to detect the time period when Vp is equal to Vo. In this example, signal don is used to activate a voltage estimation circuit "blk2" 903, which in this example performs averaging. Blk2 903 may average the value of Vp during the time period that Vp=Vo, and generate an estimate of the output voltage V0x.

In this implementation, controller 900 further includes a timing block "blk1" 902. In this example, the blk1 902 is a counter that receives clkx and signal don. Blk1 902 measures the time after switch 703 is off until inductor 704 stops conducting current to load 707 by generating a count donCnt (e.g., the time the diode is conducting current). Ip and donCnt may be used to generate an estimate of the output current in current estimation circuit "blk3" 904 according to the following equation:

$$IOX = \frac{\left(donCnt * \sum_{ton} Ip\right)}{tonCnt * T}$$

In the estimation of the output current Io, Ip is measured over the time period tonCnt, to produce an average current through switch 703. The output current To may be estimated by determining the average current through diode 705 over the switching cycle. The average current through switch 703 is equal to the average current through inductor 704 from a time after switch 703 is turned off to the time the inductor current IL reduces to zero over a time period donCnt, which is also the average diode current. The average current during tonCnt is the same as the average current during donCnt because inductor current IL increases from zero while switch 703 is on and decreases back to zero after switch 703 is off. The average current through diode 705 may, therefore, be calculated from Ip. The above equation is the total average current delivered by diode 705 to load 707 during a switching cycle having a period T. Accordingly, the average current Ip may be used to determine the estimated output current I0x.

The estimated output voltage V0x, estimated output current I0x, switch current Ip, Vref, and Iref may be provided as inputs to a processing block "blk4" 905, which may include an error amplifier, loop filter, and pulse width modulator (PWM) to generate a gate drive signal G for turning switch 703 on and off and setting the output voltage and output current as described above in FIG. 3.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, one or more steps of methods or processes discussed above may be performed in a different order (or concurrently) and still achieve desirable results. Based on the above disclosure and the following claims, other arrangements, embodiments, implementations and equivalents may be employed without departing from the scope of the invention as defined by the claims.

What is claimed is:

1. A circuit comprising:
 a voltage estimation circuit configured to receive a voltage, wherein the voltage is from a circuit node between a terminal of a switch and a terminal of an inductor, and wherein the voltage estimation circuit generates an estimation of an output voltage of a power conversion circuit based on the voltage;
 a current estimation circuit configured to receive a current, wherein the current is through the switch, and wherein the current estimation circuit generates an estimation of an output current of the power conversion circuit based on the current; and
 a pulse width modulation circuit configured to produce a pulse width modulated signal based on the estimation of an output voltage and the estimation of an output current.

2. The circuit of claim 1 wherein the voltage estimation circuit averages the voltage over a time period in a switching cycle to generate the estimation of the output voltage.

3. The circuit of claim 1 wherein the current is a first current and wherein the voltage estimation circuit generates the estimate of the output voltage based on a voltage during a time period when the switch is off and when the inductor is conducting a second current.

4. The circuit of claim 1 wherein the current is a first current and wherein the voltage estimation circuit generates the estimate of the output voltage based on a voltage during a time period when the switch is off and when the inductor is not conducting a second current.

5. The circuit of claim 1 wherein the current estimation circuit generates the estimation of the output current based on an average current through a component over a full switching cycle.

6. The circuit of claim 5 wherein the component is a diode.

7. The circuit of claim 5 wherein the component is the inductor.

8. The circuit of claim 1 wherein the voltage is sampled and wherein the voltage estimation circuit generates the estimation of the output voltage digitally.

9. The circuit of claim 1 wherein voltage estimation circuit is an analog circuit.

10. The circuit of claim 1 wherein the current is sampled and wherein the current estimation circuit generates the estimation of the output current digitally.

11. The circuit of claim 1 wherein current estimation circuit is an analog circuit.

12. The circuit of claim 1 wherein the circuit is integrated on a silicon chip.

13. The circuit of claim 12 wherein the switch is a MOS device and wherein the silicon chip comprises the MOS device.

14. The circuit of claim 12 wherein the silicon chip consists of three pads, including a first pad to receive an input voltage, a second pad to receive the voltage, and a third pad to receive a reference voltage.

15. The circuit of claim 1 wherein the power conversion circuit is configured as a boost mode converter.

16. The circuit of claim 1 wherein the power conversion circuit is configured as a buck mode converter.

17. The circuit of claim 1 wherein the power conversion circuit is configured as a buck-boost mode converter.

18. A method comprising:
 estimating an output voltage of a power conversion circuit based on a voltage, wherein the voltage is from a circuit node between a terminal of a switch and a terminal of an inductor;
 estimating an output current of a power conversion circuit based on a current, wherein the current is through the switch; and
 generating a pulse width modulated signal based on the estimation of an output voltage and the estimation of an output current.

19. The method of claim 18 wherein the current is a first current and wherein estimating the output voltage is based on a voltage during a time period of a switching cycle after the switch is off and when the inductor is conducting a second current.

20. The method of claim 18 wherein the current is a first current and wherein estimating the output voltage is based on a voltage during a time period of a switching cycle after the switch is off and when the inductor is not conducting a second current.

21. The method of claim 18 wherein estimating the output current is based on an average current through the inductor over a full switching cycle.

22. The method of claim 18 wherein estimating the output current is based on an average current through a diode over a full switching cycle.

* * * * *